United States Patent Office 3,414,925
Patented Dec. 10, 1968

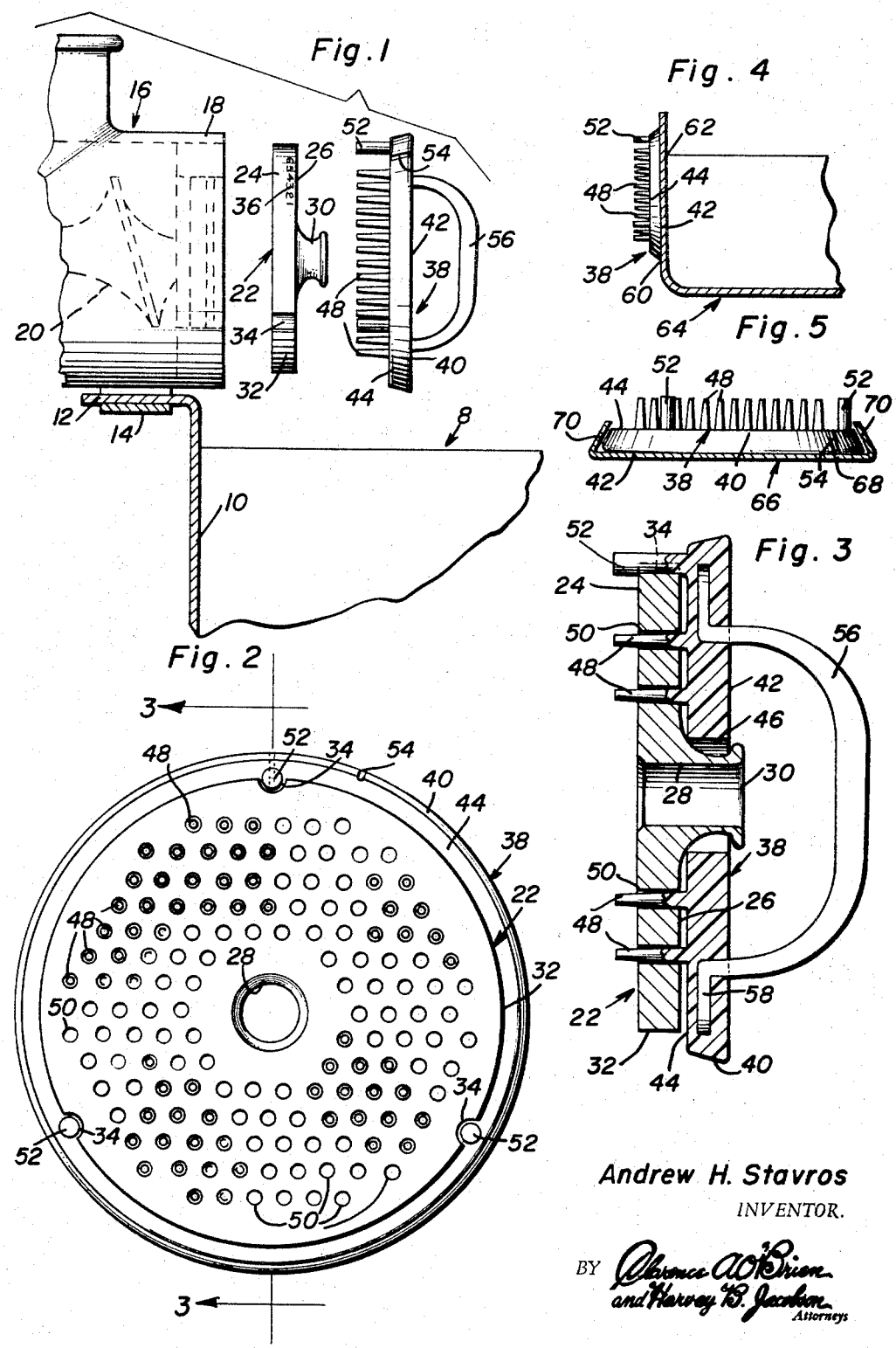
Andrew H. Stavros
INVENTOR.

3,414,925
CLEANER FOR MEAT GRINDER HEADS
Andrew H. Stavros, 1342 10th St.,
Idaho Falls, Idaho 83401
Filed June 24, 1966, Ser. No. 560,301
7 Claims. (Cl. 15—104)

ABSTRACT OF THE DISCLOSURE

A self-contained device for dislodging and clearing out contaminable residual meat deposits which often cling to and foul up meat extruding orifices in a meat grinder head plate and characterized by a cleaner plate. This cleaner plate is made from moldable plastic material and has a flat side equipped with integral laterally projecting meat plunging and clearing prongs which are properly tapered. The outer peripheral edge of the plate is provided with piloting and positioning guide pins seatable in keeper notches provided therefor. The hub portion of the plate has an axial hole.

---

This invention relates, broadly construed, to food choppers and meat grinders wherein a rotary worm or screw conveyor feeds the contents, meat for example, to cutter means turning against the face of a head plate having a multiplicity of extruding orifices and pertains, specifically speaking, to new and improved orifice clean-out means which when properly used sanitizes and restores the head plate for approved subsequent use.

Persons conversant with the art to which this invention pertains are aware that devices have been devised and used for clearing and cleaning head plate orifices. One prior art adaptation is shown, for example, in Longan's meat chopper plate cleaner, Patent 2,708,447. Unlike the present achievement Longan discloses a cleaner which may be associated with a water supply which is pressurized and whereby jets of water under pressure scavenge and clean the orifices.

An object of the present invention is to improve upon prior art head plate cleaners and to thus advance this line of endeavor. One improvement, as will be hereinafter more fully appreciated, has to do with a discoidal cleaner plate which is made from moldable non-corrodible stainless steel, aluminum, suitable sturdy commercial plastics or the like. That side of the cleaner plate which lines up with and abuts the exterior or outward side of the head plate is provided with integral laterally projecting orifice entering deposit plunging and clearing studs or prongs which function with requisite nicety because they are not only of proper length and proportional cross-sectional dimension but are correctly tapered toward their leading or piloting ends. Then, too, the unplugging and scavenging action is such that the residual accumulation is pushed toward the knife or cutter surface (inward face) of the head plate thus insuring the sanitized result desired.

The cleaner plate is capable of practical manual handling and use with an attached hand grip. However, it is within the purview of the concept to omit the handle and mount the cleaner plate fixedly and conveniently on (1) the front wall of a tray-type meat collecting and accumulating bin or (2) to locate and mount it for use (singly or collectively) in the channel of a channel-shaped support rack.

It will also be hereinafter evident that novelty is predicated on the cleaner plate by itself, that is, as a new article of manufacture. In addition, the inventive concept comprehends the appropriation and use of the cleaner plate in combination with the bodily attachable and detachable head plate. To this end the over-all invention relies for novelty on a head plate which has a flat precision finished interior or inward surface which is designed and adapted to accommodate a rotary cutter knife or equivalent cutter means which has sweeping or wiping contact with said surface. The plate is provided at its axial center with bearing means characterized in part by a hub-like sleeve which projects laterally beyond the outward face or surface of the head plate. This outward surface is likewise flat and the body portion of the plate has a multiplicity of meat or equivalent food extruding and discharging orifices which as is usual open through both surfaces and are cylindrical in cross-section and are arranged in predetermined relationship relative to marking means on the peripheral or marginal surface of the plate. This marginal surface also has circumferentially spaced equidistant transverse keeper notches which are related to each other and to the position marking numbers or equivalent designating means. It follows that the orifice clean-out means which serves to dislodge and clear out contaminable residual meat deposits likewise comprises a cleaner plate which corresponds in shape and size with the shape and size of the head plate. This cleaner plate is an innovation in that the body portion is essentially imperforate and has a first flat side which is adapted to match and firmly abut the aforementioned outward surface of the head plate. This side is provided with a multiplicity of laterally projecting integral orifice entering deposit clean-out studs or prongs. These prongs correspond in number and relative positions and relationship with the coordinating orifices with which they coincide. They are used for cleaning scavenging and sanitizing needs. The over-all cleaning plate with prongs is of one-piece construction and made of non-corrodible material such as stainless steel, aluminum, or an appropriate grade of plastic material. Considered alone or in combination with the head plate the cleaner plate is an innovation in that it has position finding, piloting as well as guide pins. These pins project laterally from the side of the plate which is equipped with the aforementioned prongs. It follows that these guide pins are in predetermined positions relative to each other and to the keeper notches and are seated in the keeper notches to achieve the desired orientation between the two plates. Furthermore, the cleaner plate has a centralized axial opening for and through which and beyond which the hub-like sleeve is adapted to extend when the two plates are lined up in abutting contact. Then too, the cleaner plate is provided with a peripheral mark, usually a simple kerf which is adapted to register with the aforementioned assembling markings on the head plate whereby to properly line up the prongs with the orifices for satisfactory coordinate peformance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view showing a fragmentary portion of a food collecting bin or tray, showing the discharge end of the worm-equipped grinder and, what is more important, the attachable and detachable head plate, how it is constructed, and how it cooperates with the complemental handle-equipped cleaner plate.

FIG. 2 is an enlarged elevational view showing how the head plate and cleaner plate cooperate when placed face-to-face for scavenging and residual deposit clearing relationship.

FIG. 3 is a section taken on the plane of the section line 3—3 of FIG. 2.

FIG. 4 is a fragmentary view on a small scale showing a portion of a collecting tray-type bin and also showing how the cleaner plate may, if desired, be fixedly mounted in an accessible and useable position on the exterior of the front wall of the bin.

FIG. 5 is a view showing a further modification, that is, wherein the cleaner plate is shown mounted for use in the channel portion of a channel-shaped support or rack which may in turn be mounted on a bin, wall or other stationary support surface and which may accommodate one or more cleaner plates.

It is to be pointed out at the introductory portion of the description of the details that the essence of the invention resides in the novel cleaner plate by itself, or in combination with the attachable and detachable head plate as shown for example in FIGS. 1 to 3 inclusive. It is further pointed out that the cleaner plate may be utilized with or without handle means. Accordingly, it may be employed in the combination manner illustrated perhaps best in FIGS. 2 and 3. Alternatively, and where the handle is omitted, the cleaner plate can be mounted as a first modification on a bin as shown in FIG. 4 or mounted for use in a support rack as shown in a further modification in FIG. 5. Insofar as the cleaner plate is concerned it is the same, except for the handle, in all views therefore like reference numerals will be employed to designate like parts throughout all of the views.

Referring first to FIG. 1 the numeral 8 designates a receiver or bin sometimes referred to as a meat collecting and accumulating trough or tray. The tray here shown, that is in FIG. 1, has a front wall 10 with means 12 connectible with a bracket 14 to support the attachable cooperable food chopper or grinder denoted generally at 16. This is a more or less conventional type of meat grinder having a housing or casing whose discharge end is denoted at 18 and which is provided interiorly with a screw type conveyor or worm 20. It is in the discharge end 18 that the aforementioned head plate 22 is mounted.

The head plate 22 is discoidal and of customary size and thickness in material and has an inward or interior flat face or surface 24 with which the cutting knife (not detailed) has cooperating wiping contact. The plate likewise has an exterior flat surface 26, there being an axial bearing 28 at the center provided at the right with a protruding hub-like sleeve 30. The smooth peripheral rim or surface 32 is provided, as usual, with equidistant circumferentially spaced open-ended notches which serve as keepers as at 34. Also at a predetermined circumferential point certain sequential number 36 are provided and for purposes of the present invention constitute fixed marker means which comes into play in assisting in properly locating or orienting the attachable and detachable improved cleaner plate denoted generally by the numeral 38.

The plate 38 is of a diameter slightly greater than the diameter of the head plate 22 as brought out in FIGS. 2 and 3 in particular. The peripheral surface of this cleaner plate is denoted at 40, the outward flat surface at 42 and the inward flat surface at 44. These surfaces may be designated as first and second surfaces. There is an axial hole of suitable diameter as at 46 which permits the hub-like member 30 to extend through and beyond the same when the two plates are in face-to-face cooperating relationship as illustrated in FIGS. 2 and 3. The first side surface 44 is provided with integral distributively arranged studs or prongs which are individually denoted at 48 and which are of requisite length, cross-section and are tapered so as to extend through and beyond the extruding orifices 50 in the body portion of the head plate. This same side 44 is provided adjacent but inwardly of the periphery 40 the circumferentially spaced stout cylindrical piloting and guiding pins 52 which are designed and adapted to be removably seated in the aforementioned keeper notches 34. To assist in bringing the two plates 22 and 38 into cooperating and aligned relationship it is not only necessary to seat the guide pins 52 in the notches 34 but, before attempting to do so, to line up the indicating kerf or marker 54, which is on the periphery 40, with the afore-mentioned marker numbers or media 36 as is evident. This is essential because otherwise the tapered orifice clear out and cleaning prongs 48 would not coordinate properly with the orifices 50. It follows that the improvements involving the guide pins 52, notches 34, tapered studs or prongs 48 and coordinating indicating and marking means 36 and 54 is highly important in comprehending the essence of the inventive concept.

As previously mentioned it is within the purview of the invention to provide the side 42 of the clean-out plate with a handle. This may comprise a simple U-shaped hand grip 56 which as shown in FIG. 3 bridges the hole 46 and has lateral end portions 58 anchored in the body of the plate 38.

With reference now to FIG. 4 it is not necessary to again describe in detail the cleaner plate. On the other hand, it is significant to point out that the handle 56 should be omitted and that the surface 42 can be superimposed upon on exterior surface 60 of a front wall 62 of the tray-like pan 64 whereby to thus position the studs or prongs in a proper area of use and to permit the clean-out job of the head plate to be taken care of in what is believed to be a substantially self-evident manner.

In the modification shown in FIG. 5 and instead of providing a handle for mounting the device on a bin wall, it is simply mounted in the trough or channel portion of a channel-shaped support or so-called rack 66. This rack comprises a web 68 and has inclined turned in marginal flanges 70 which cooperate in positioning and retaining the clean-out device or plate in the operable manner shown. It is within the purview of the invention to mount the rack 66 on a bin wall, or room wall, bench or the like and in fact the rack can be of suitable length so as to accommodate not one but a plurality of pronged clean-out plates.

The manner in which the unit or plate 38 is constructed and utilized will be clear, it is submitted, from the views of the drawing and description thereof in the specification. Therefore, a more extensive description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a readily applicable and removeable head plate adapted to be operatively mounted at the rotary cutter end of a meat grinder, said plate having a flat precision finished inward surface designed and adapted to accommodate cutter means which has rotary wiping contact with said surface, said plate being provided at its axial center with bearing means embodying an aligned hub-like sleeve projecting laterially beyond the outward surface of said plate, said outward surface being otherwise flat, the body portion of said plate having a multiplicity of meat extruding and discharging orifices, and orifice clean-out means for dislodging and clearing out contaminable residual meat deposits which ordinarily accumulate within, cling to the walls of and often undesirably plug up said orifices, said means comprising a cleaner plate separate from but similar in size and shape to said head plate, the body of said cleaner plate being imperforate and having a first side adapted to match and firmly abut the aforementioned outward surface of said head plate, said first side having a multiplicity of integral laterally projecting orifice entering deposit plunging and clean-out prongs, said prongs corresponding in number and relative positions and relationship with the co-ordinating orifices with which they coincide when being used for cleaning, scavenging and sanitizing needs, said prongs and the plate carrying the same being of one-piece construction and made of non-corrodible washable and cleanable material, said head plate being discoidal, said orifices being cylindrical in cross-section, all of the same cross-sectional dimension and distributively arranged, and said prongs being likewise distributively located and matchably alignable with said orifices, gradually tapered, proportional in size with, and of a length appreciably greater than the length of their respectively cooperable and orientated orifices.

2. The combination according to claim 1, and wherein said head plate is marginally provided with a smooth peripheral edge, said edge having equidistant circumferentially spaced keeper notches at least one of which is proximal to and oriented with easy-to-see markings and one purpose of which is to indicate to a user the prescribed manner of correctly locating and using the head plate, said cleaner plate being likewise discoidal and conforming in diameter with the diameter of said head plate, the aforementioned first side of said cleaner plate having position-finding, piloting and guide pins projecting laterally and adapted to be removably seated in predetermined ones of said keeper notches, said cleaner plate having a centralized axial opening for and through and beyond which said hub-like sleeve is adapted to extend when the two plates are lined up in abutting contact and with said guide pins seated in their respectively cooperating keeper notches, and said cleaner plate having a peripheral mark which is adapted to register with the aforementioned markings, whereby to line up said prongs with said orifices for cooperatively associated performance.

3. The combination according to claim 2, and, in combination therewith, a drawer-like ground meat bin having a front wall, and wherein said cleaner plate is superimposed on and is fixedly mounted for quick accessible use on said front wall.

4. The combination defined in and according to claim 2, and, in combination therewith, a supporting rack for said cleaner plate, said rack being channel-shaped in cross-section and of a dimension that said cleaner plate can be lodged for use in the channel portion of said rack.

5. The combination according to claim 1, and wherein the side of said cleaner plate opposite to said first side is provided with a fixedly mounted hand grip.

6. As a new article of manufacture, a self-contained sanitizing device possessed of the capability of readily, conveniently and efficaciously dislodging and cleaning out contaminable residual meat deposits such as are known to accumulate within, cling to and foul up the usual meat extruding orifices in the body of a conventional discoidal meat grinder head plate, said device comprising: a discoidal cleaner plate made of non-corrodible moldable material and being of a diameter conformable with the diameter of said head plate and having first and second sides, the body of said plate being imperforate and said first side being adapted to conformingly match and firmly abut a coacting outward surface of said head plate when being used, said first side having a multiplicity of molded laterally projecting orifice entering residual meat plunging and orifice clearing prongs, all of said prongs being alike and of tapered form and corresponding in number and relative position and relationship to the stated orifices, said cleaner plate having an axial hole, said one side being provided with integral cylindrical circumferentially spaced stout position-finding, piloting and guide pins, the latter projecting laterally from said one side and being adjacent the peripheral edge of said plate and situated so that they can be removably seated in keeper notches provided therefor in the mating peripheral edge of said head plate, and said cleaner plate also having a prominent kerf in a predetermined peripheral edge, said kerf being carefully related to said prongs and also said guide pins and being adapted to be lined up with cleaner plate position indicating and marking means present on a marginal edge portion of said head plate.

7. As a new article of manufacture, a self-contained sanitizing device possessed of the capability of readily, conveniently and efficaciously dislodging and clearing out contaminable residual meat deposits such as are know to accumulate within, cling to and foul up the usual meat extruding orifices in the body of a conventional discoidal meat grinder head plate, said device comprising: a discoidal cleaner plate made of non-corrodible moldable plastic material and having first and second sides, the body of said plate being imperforate and said first side being adapted to conformingly match and firmly abut a coacting outward surface of said head plate when being used, said first side having a multiplicity of molded laterally projecting orifice entering residual meat plunging and orifice clearing prongs, all of said prongs being alike and of tapered form, said cleaner plate having an axial hole, said one side being provided with integral cylindrical circumferentially spaced stout position-finding, piloting and guide pins projecting laterally from said one side and being adjacent the peripheral edge of said plate and situated so that they can be removably seated in keeper notches provided therefor in the mating peripheral edge of said head plate.

References Cited

UNITED STATES PATENTS 2,633,594    4/1953    Robbins _____ 15—236
2,226,317    12/1940    Myers _____ 15—104 X

FOREIGN PATENTS 891,813    10/1953    Germany.

EDWARD L. ROBERTS, *Primary Examiner.*

U.S. Cl. X.R.

15—236